(12) United States Patent
Maeda et al.

(10) Patent No.: US 9,604,561 B2
(45) Date of Patent: Mar. 28, 2017

(54) GRIP MOUNTING STRUCTURE FOR UTILITY VEHICLE, UTILITY VEHICLE WITH THE SAME, AND GRIP

(71) Applicant: KAWASAKI JUKOGYO KABUSHIKI KAISHA, Hyogo (JP)

(72) Inventors: Kazuhiro Maeda, Akashi (JP); Itsuo Takegami, Kobe (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 0 days.

(21) Appl. No.: 14/704,209

(22) Filed: May 5, 2015

(65) Prior Publication Data

US 2016/0325663 A1 Nov. 10, 2016

(51) Int. Cl.
*B60R 21/13* (2006.01)
*B60N 3/02* (2006.01)

(52) U.S. Cl.
CPC ............... *B60N 3/02* (2013.01); *B60R 21/13* (2013.01)

(58) Field of Classification Search
CPC .................................. B60N 3/02; B60N 3/026
USPC ............................. 286/756; 296/71; 280/756
See application file for complete search history.

(56) References Cited

U.S. PATENT DOCUMENTS

| | | | |
|---|---|---|---|
| 6,523,879 B2 | 2/2003 | Mizuta | |
| 7,975,865 B2* | 7/2011 | Marcel | B65D 90/008 |
| | | | 206/512 |
| 8,979,123 B1* | 3/2015 | Takahashi | B62D 23/005 |
| | | | 280/748 |
| 8,998,283 B1* | 4/2015 | Yamamoto | B60N 2/24 |
| | | | 280/756 |
| 9,187,023 B2* | 11/2015 | Takahashi | B60P 1/16 |
| 9,308,813 B1* | 4/2016 | Egami | B60K 15/03006 |
| 2009/0127834 A1* | 5/2009 | Hemingway | B60N 3/026 |
| | | | 280/728.2 |
| 2009/0184531 A1* | 7/2009 | Yamamura | B60N 2/3011 |
| | | | 296/37.6 |

* cited by examiner

*Primary Examiner* — Toan To
(74) *Attorney, Agent, or Firm* — Wenderoth, Lind & Ponack, L.L.P.

(57) ABSTRACT

A grip mounting structure for a utility vehicle includes an R.O.P.S. surrounding a riding space provided with a seat, a front-seat central grip provided to the R.O.P.S. and having a holding portion configured to be held by a crew member sitting on the seat, and an additional grip detachably mounted to at least one of the R.O.P.S. and the front-seat central grip and having a holding portion configured to be held by the crew member. The holding portion of the additional grip has a projection amount to the riding space that is larger than a projection amount of the holding portion of the front-seat central grip to the riding space.

11 Claims, 7 Drawing Sheets

GRIP MOUNTING STRUCTURE FOR UTILITY VEHICLE, UTILITY VEHICLE WITH THE SAME, AND GRIP

BACKGROUND OF THE INVENTION

Field of the Invention

The present invention relates to a grip mounting structure for a utility vehicle.

Description of the Related Art

A utility vehicle is conventionally equipped with a grip to be held by a crew. A crew holds the grip to support his/her body while the utility vehicle is traveling (see U.S. Pat. No. 6,523,879, for example).

SUMMARY OF THE INVENTION

Such a grip can be mounted to a R.O.P.S. surrounding a riding space so as not to block motion of getting into or out of the riding space. Furthermore, the grip is sized and positioned so as to be easily held by a crew having an ordinary body size and seated in a natural posture. A small crew (e.g. a woman or a child) will need to raise his/her back from a seat back in order to hold the grip, and a hand may not reach the grip in a naturally seated posture.

If a utility vehicle is equipped with a grip for a small crew as standard in addition to an ordinary grip, such a utility vehicle needs a higher cost.

The present invention has been made in view of the problem mentioned above, and an object thereof is to provide a grip mounting structure for a utility vehicle, a utility vehicle including the grip mounting structure, and a grip that can be mounted selectively for each user and can be held even by a small crew seated in a natural posture.

In order to achieve the object mentioned above, according to an aspect of the present invention, a grip mounting structure for a utility vehicle, the structure includes: a R.O.P.S. surrounding a riding space provided with a seat; a first grip provided to the R.O.P.S. and having a first holding portion configured to be held by a crew sitting on the seat; and a second grip detachably mounted to at least one of the R.O.P.S. and the first grip and having a second holding portion configured to be held by the crew; wherein the second holding portion has a projection amount to the riding space larger than a projection amount of the first holding portion to the riding space.

In the above configuration, the projection amount of the second grip to the riding space is larger than the projection amount of the first grip to the riding space. Even a small crew, who has difficulty in reaching the first holding portion of the first grip, can grip the second grip in a naturally seated posture. Furthermore, the second grip can be mounted selectively for a small crew. This configuration prevents the second grip from being equipped uselessly for a crew who does not need the second grip, and can thus suppress increase in cost for the utility vehicle.

The grip mounting structure for a utility vehicle can preferably have any of the following configurations.

(1) The second holding portion is movable between a usable position where the second holding portion is held by the crew and a withdrawing position where the second holding portion is withdrawn to be distant from the seat and is not held by the crew.

The second holding portion is movable between the usable position and the withdrawing position in the configuration (1). The second holding portion not in use is moved to the withdrawing position so as not to inhibit the crew from getting into and out of the riding space as well as from holding the first holding portion.

(2) In the configuration (1), the second grip further includes a proximal portion mounted to at least one of the R.O.P.S. and the first grip, a support portion fixed to the proximal portion and supporting the second holding portion to be movable between the usable position and the withdrawing position, and a positioning pin configured to locate the second holding portion at the usable position or the withdrawing position, the support portion has a first positioning hole and a second positioning hole, the second holding portion has a through hole, the through hole has a center axis that aligns with a center axis of the first positioning hole when the second holding portion is located at the usable position and that aligns with a center axis of the second positioning hole when the second holding portion is located at the withdrawing position, the second holding portion is located at the usable position by the positioning pin that is inserted through the through hole and the first positioning hole, and the second holding portion is located at the withdrawing position by the positioning pin that is inserted through the through hole and the second positioning hole.

The configuration (2) is simply provided with the positioning pin, the through hole, and the first and second positioning holes so as to locate and fix the second holding portion at the usable position and the withdrawing position.

(3) In the configuration (2), the positioning pin is manually attached to and detached from the through hole.

The configuration (3) allows the positioning pin to be attached to and detached from the second holding portion and the support portion manually without any tool. The second holding portion can be easily moved to the usable position or the withdrawing position.

(4) In the configuration (2), the support portion includes a first stopper configured to prevent the second holding portion located at the usable position from further moving beyond the usable position.

The second holding portion is brought into contact with the first stopper so as to easily cause the through hole to align with the center axis of the first positioning hole in the configuration (4). This configuration can improve workability of inserting the positioning pin for the second holding portion located at the usable position. Furthermore, the first stopper as well as the positioning pin can ideally resist a load for turning the second holding portion beyond the usable position.

(5) In the configuration (2), the support portion includes a second stopper configured to prevent the second holding portion located at the withdrawing position from further moving beyond the withdrawing position.

The second holding portion is brought into contact with the second stopper so as to easily cause the through hole to align with the center axis of the second positioning hole in the configuration (5). This configuration can improve workability of inserting the positioning pin for the second holding portion located at the withdrawing position. Furthermore, the second stopper as well as the positioning pin can ideally resist a load for turning the second holding portion beyond the withdrawing position.

(6) In the configuration (2), the proximal portion is fixed by a fastening member to the R.O.P.S. or the first grip.

The configuration (6) can easily fix the second grip to the R.O.P.S. or the first grip.

(7) The second holding portion is at least partially covered with an elastic body.

In the configuration (7), the elastic body is deformed in accordance with gripping force of the crew and the size of a hand of the crew, so as to offer comfortable hold and prevent slip of the hand holding the second holding portion. This configuration can improve holdability and further improve body support. The elastic body can be made of rubber, sponge, resin, or the like.

(8) In the configuration (2), the second holding portion has a proximal end supported by the support portion and a distal end located opposite to the proximal end, and the distal end is bent upward in the state where the second holding portion is located at the usable position.

The configuration (8) can prevent the hand of the crew holding the second holding portion from sliding toward the distal end and releasing the second holding portion.

According to another aspect of the present invention, a utility vehicle includes: a R.O.P.S. surrounding a riding space provided with a seat; a first grip provided to the R.O.P.S. and having a first holding portion configured to be held by a crew sitting on the seat; and a second grip detachably mounted to at least one of the R.O.P.S. and the first grip and having a second holding portion configured to be held by the crew; wherein the second holding portion has a projection amount to the riding space larger than a projection amount of the first holding portion to the riding space.

Still another aspect of the present invention provides a grip mounted to a utility vehicle including: a R.O.P.S. surrounding a riding space provided with a seat, and a first grip provided to the R.O.P.S. and having a first holding portion configured to be held by a crew sitting on the seat; wherein the grip is regarded as a second grip, is detachably mounted to at least one of the R.O.P.S. and the first grip, and has a second holding portion configured to be held by the crew, and the second holding portion has a projection amount to the riding space larger than a projection amount of the first holding portion to the riding space.

In summary, the grip mounting structure for a utility vehicle, the utility vehicle including the grip mounting structure, and the grip according to the present invention allow the grip to be mounted selectively for each user and be held even by a small crew seated in a natural posture.

DETAILED DESCRIPTION OF THE INVENTION

FIGS. 1 to 5 each depict a utility vehicle including a grip mounting structure according to the present invention. A preferred embodiment of the present invention will now be described with reference to these figures. For easier description, assume that the utility vehicle travels "forward" with respect to the utility vehicle and respective components, and left and right sides of a crew directed forward correspond to "left and right sides" of the utility vehicle and these components.

Figure 1:
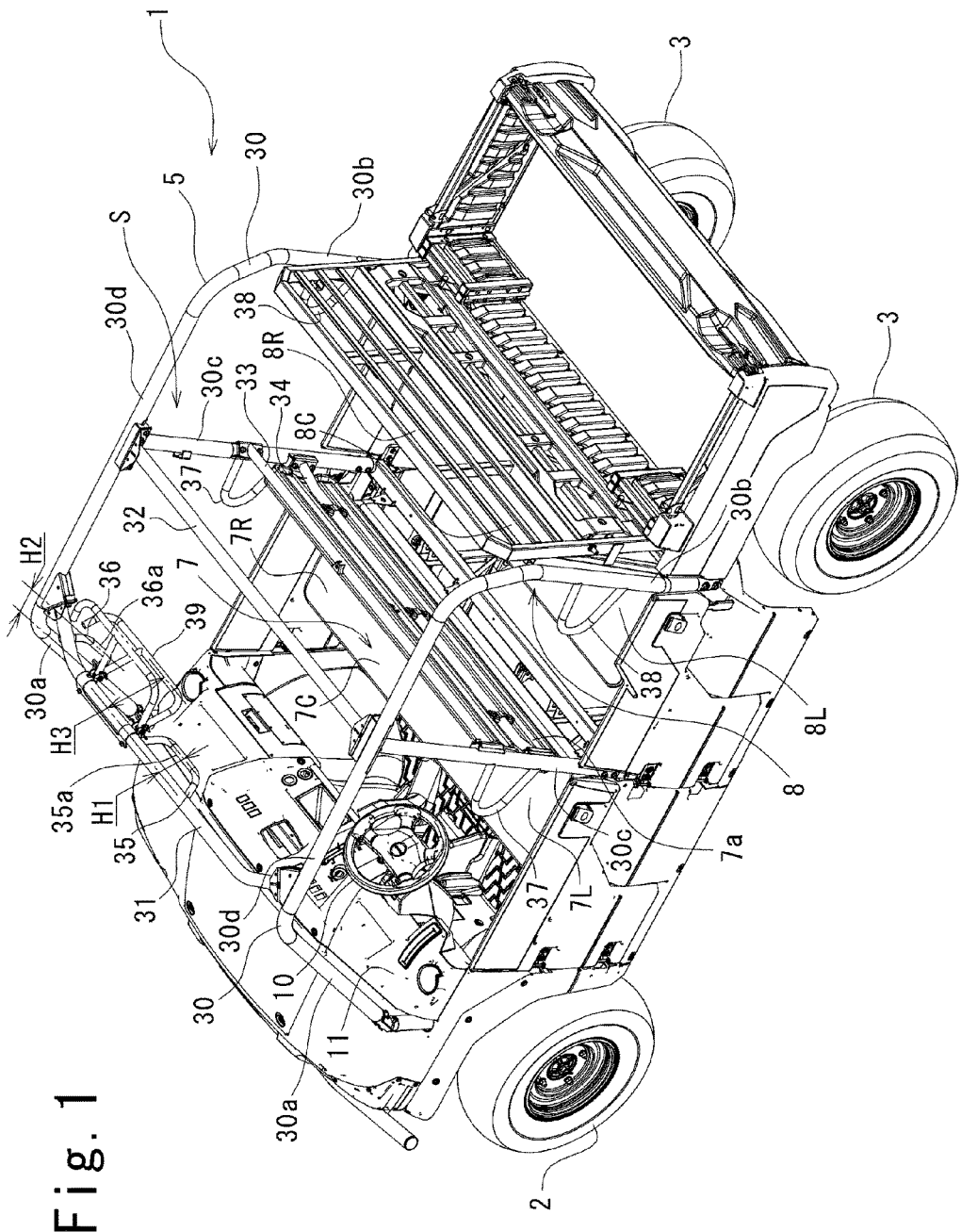
FIG. 1 is a perspective view of a utility vehicle including a grip mounting structure according to an embodiment of the present invention.

As depicted in FIG. 1, a utility vehicle 1 includes left and right front wheels 2 disposed at the front end of the utility vehicle 1, and left and right rear wheels 3 disposed at the rear end of the utility vehicle 1. A riding space S is located between the front wheels 2 and the rear wheels 3 in the anteroposterior direction, and is surrounded with a R.O.P.S. 5. The riding space S accommodates a front seat 7 and a rear seat 8. A steering wheel 10 and a dashboard 11 are disposed at the front end of the riding space S. The R.O.P.S. is an abbreviation for a rollover protective structure.

The front seat 7 is configured as a bench seat for three crews, and has a right seating area 7R for a crew seated at the right end, a central seating area 7C for a crew seated in the center, and a left seating area 7L (driver's seat) for a crew seated at the left end. The rear seat 8 is also configured as a bench seat for three crews, and has a right seating area 8R, a central seating area 8C, and a left seating area 8L.

The R.O.P.S. 5 includes a pair of left and right side units 30 made of metal pipes, and first to fourth cross members 31 to 34 that are made of metal pipes and connect the side units 30. Each of the side units 30 integrally includes a front pillar portion 30a, a rear pillar portion 30b, and a mid pillar portion 30c that extend substantially vertically, and an upper beam portion 30d that extends anteroposteriorly. The front pillar portion 30a, the rear pillar portion 30b, and the upper beam portion 30d are formed by bending a pipe member having a circular section into a substantially U shape in a side view. The mid pillar portion 30c is disposed at a position substantially corresponding to a seat back 7a of the front seat 7 and is firmly fixed by welding to an anteroposteriorly halfway position of the upper beam portion 30d.

The upper beam portions 30d are connected to each other by the first and second cross members 31 and 32. The mid pillar portions 30c are connected to each other by the third cross member 33 substantially in the vertical center and are further connected to each other by the fourth cross member 34 below the third cross member 33. The seat back 7a of the front seat 7 is attached to the fourth cross member 34.

The R.O.P.S. 5 is provided with a front-seat central grip 35 and a front-seat right grip 36 (first grip) to be held by crews. The front-seat central grip 35 is mounted to the first cross member 31 at a position corresponding to the central seating area 7C in the front seat 7 so as to project in a substantially U shape toward the front seat 7. The front-seat right grip 36 is mounted to the front pillar portion 30a of the right side unit 30 so as to be directed to the right seating area 7R in the front seat 7 and project in a substantially U shape to the riding space S.

The R.O.P.S. 5 is further provided with front-seat side guards 37 and rear-seat side guards 38. The front-seat side guard 37 is provided at the mid pillar portion 30c of each of the left and right side units 30 so as to project forward in a substantially U shape. The rear-seat side guard 38 is provided at the rear pillar portion 30b of each of the left and right side units 30 so as to project forward in a substantially U shape.

While the utility vehicle is traveling, the crew (driver) seated in the left seating area 7L in the front seat 7 holds the steering wheel 10, the crew seated in the central seating area 7C in the front seat 7 holds the front-seat central grip 35, and the crew seated in the right seating area 7R in the front seat 7 holds the front-seat right grip 36, to support their bodies. Crews on the rear seat 8 mainly hold the third cross member 33 to support their bodies. The crews on the rear seat 8 can alternatively hold the side guard 37 or 38 to support their bodies.

The front-seat central grip 35 and the front-seat right grip 36 are provided such that crews in average body sizes (e.g. 175 cm tall) seated in the central seating area 7C and the right seating area 7R can hold the grips in natural postures without raising their backs from the seat back 7a, respectively. The front-seat central grip 35 and the front-seat right grip 36 have limited projection amounts H1 and H2 to the riding space S so as not to block motion of getting into or out of the riding space S and a view from the riding space S.

The projection amount H1 indicates a length from the center axis of the first cross member 31 to the center axis of a holding portion 35a (first holding portion) of the front-seat central grip 35. The projection amount H2 indicates a length from the center axis of the front pillar portion 30a to the center axis of a holding portion 36a (first holding portion) of the front-seat right grip 36.

The grips 35 and 36 are configured for crews in average body sizes. A small crew (e.g. 150 cm tall) raises his/her back from the seat back 7a to hold the grip 35 or 36 and has difficulty in holding the grip in a natural posture. The utility vehicle according to the present embodiment is thus equipped with an additional grip 39 (second grip) for a small crew, in addition to the front-seat central grip 35 and the front-seat right grip 36 that are equipped as standard.

Figure 2:
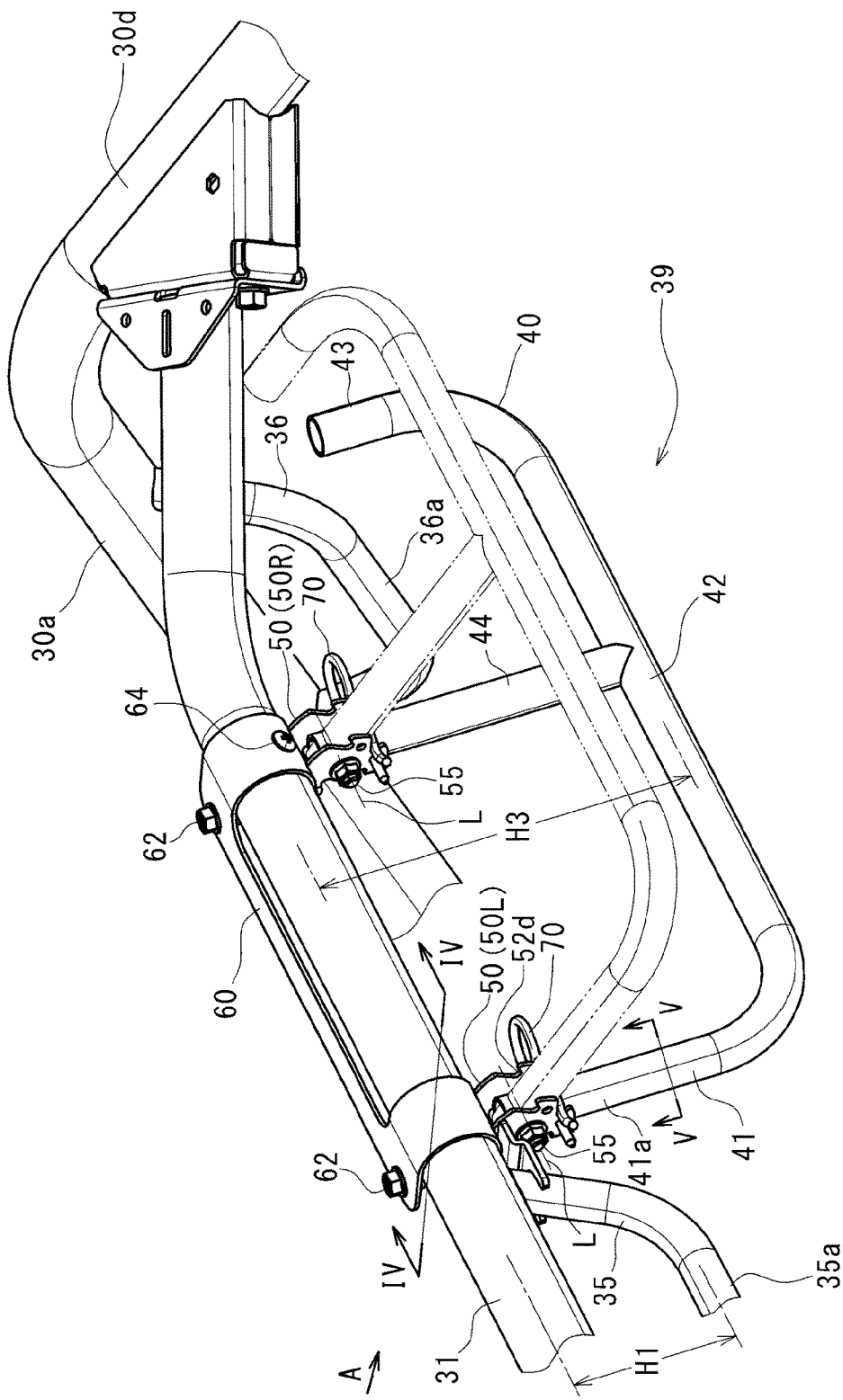
FIG. 2 is an enlarged view of a principal part of the grip depicted in FIG. 1.

As depicted in FIG. 2, the additional grip 39 is mounted to the first cross member 31 on the right of the front-seat central grip 35. More specifically, the additional grip 39 is provided so as to correspond over the central seating area 7C and the right seating area 7R in the front seat 7 (see FIG. 1).

The additional grip 39 includes a holding portion 40 (second holding portion) held by a crew, left and right support portions 50 turnably supporting the holding portion 40, a proximal portion 60 configured to attach the left and right support portions 50 to the first cross member 31, and positioning pins 70 configured to position the holding portion 40 relatively to the support portions 50. The holding portion 40 is movable to a usable position (depicted by solid lines) for use by a crew and to a withdrawing position (depicted by chain lines) above the usable position. For example, the usable position is reached by turning 45 degrees downward from the withdrawing position.

The holding portion 40 located at the usable position extends substantially in parallel with the front-seat central grip 35, backward so as to be slanted downward. The holding portion 40 located at the withdrawing position extends anteroposteriorly substantially in parallel with the upper beam portions 30d of the side units 30.

The holding portion 40 is a metal pipe in a substantially E shape. The holding portion 40 located at the usable position has a first linear portion 41 extending from the left support portion 50L toward the front seat 7 (see FIG. 1), a second linear portion 42 bending from the first linear portion 41 and extending rightward, a third linear portion 43 bending from the second linear portion 42 and extending toward the first cross member 31, and a fourth linear portion 44 extending from the right support portion 50R toward the second linear portion 42 and joined to the second linear portion 42.

The second linear portion 42 extends so as to correspond to the range from the central seating area 7C to the right seating area 7R in the front seat 7 (see FIG. 1). A projection amount H3 of the holding portion 40 to the riding space S, that is, the length from the center axis of the first cross member 31 to the center axis of the second linear portion 42, is set to be substantially twice the projection amount H1.

Figure 3:
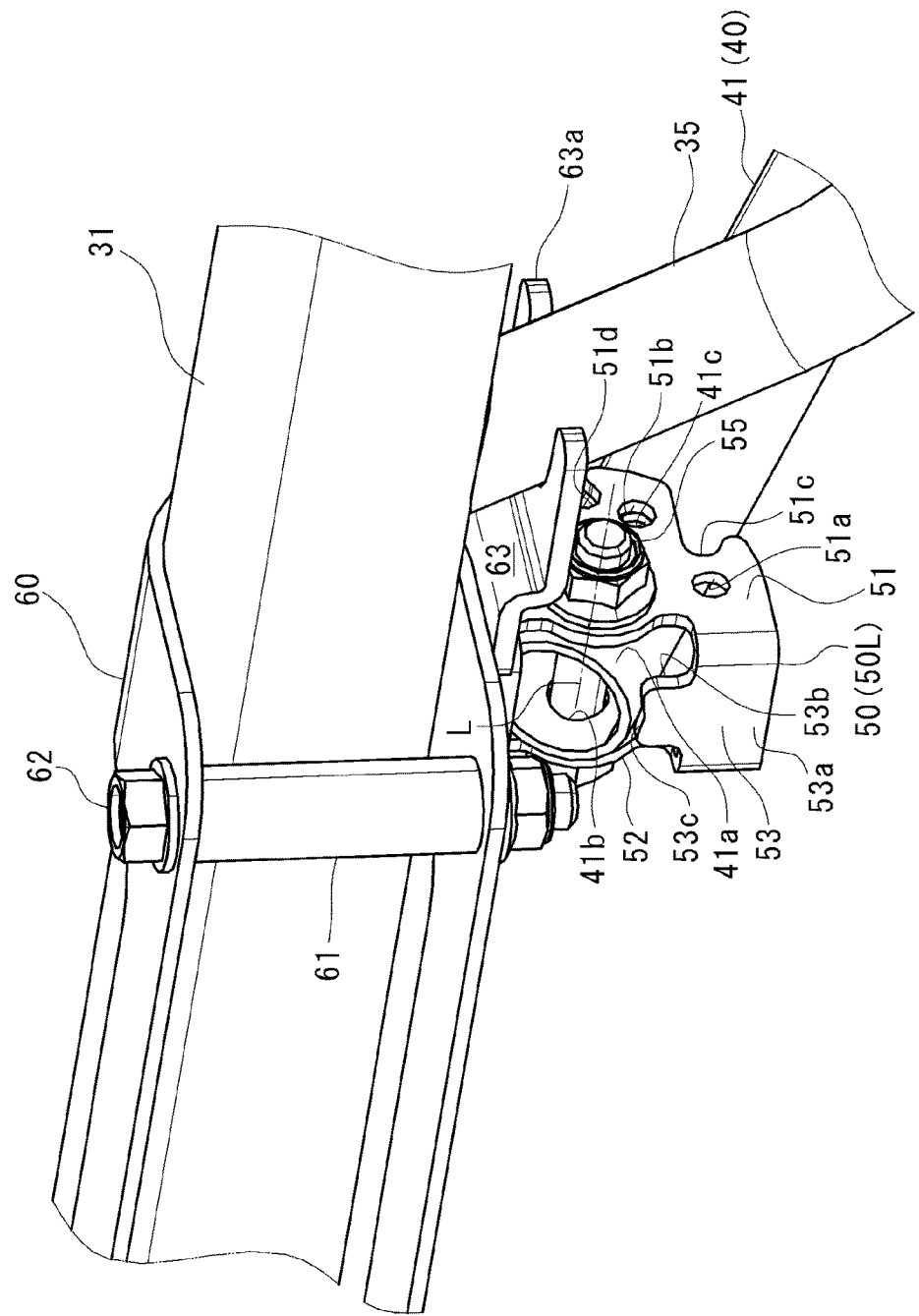
FIG. 3 is a view along an arrow A indicated in FIG. 2.

FIG. 3 is an enlarged view along an arrow A indicated in FIG. 2, of the left support portion 50L and its vicinity, and depicts a state where the positioning pin 70 is removed and the holding portion 40 is located at the withdrawing position. As depicted in FIG. 3, the first linear portion 41 has a proximal end 41a provided with a turn hole 41b through which a fastening member 55 serving as a rotary shaft as to be described later penetrates transversely. The proximal end 41a is further provided with a through hole 41c through which the positioning pin 70 penetrates transversely.

The support portion 50 is a metal plate bent into a substantially U shape, and includes left and right opposed portions 51 and 52 that are opposed to each other and extend vertically (and anteroposteriorly) and a connecting portion 53 that connects front ends of the left and right opposed portions 51 and 52. At the support portion 50, upper edges of the left and right opposed portions 51 and 52 are firmly fixed by welding or the like to the outer periphery of the proximal portion 60.

Between the left and right opposed portions 51 and 52, the proximal end 41a of the holding portion 40 is turnably supported by the fastening member 55 that transversely penetrates the turn hole 41b. The holding portion 40 is supported turnably about a center axis L of the fastening member 55 so as to be movable between the usable position and the withdrawing position.

The left and right opposed portions 51 and 52 are provided with first positioning holes 51a and 52a of which center axes align with the center axis of the through hole 41c in the holding portion 40 located at the usable position, and second positioning holes 51b and 52b of which center axes align with the center axis of the through hole 41c in the holding portion 40 located at the withdrawing position. The left and right opposed portions 51 and 52 are further provided with first cutouts 51c and 52c on the peripheral edges at positions corresponding to the first positioning holes 51a and 52a, and second cutouts 51d and 52d on the peripheral edges at positions corresponding to the second positioning holes 51b and 52b.

More specifically, in a side view, straight lines extending from the first positioning holes 51a and 52a to the first cutouts 51c and 52c are perpendicular to straight lines connecting the center axis L and the center axes of the first positioning holes 51a and 52a, respectively. Similarly, straight lines extending from the second positioning holes 51b and 52b to the second cutouts 51d and 52d are perpendicular to straight lines connecting the center axis L and the center axes of the second positioning holes 51b and 52b, respectively.

The connecting portion 53 extends transversely, and has front and rear surfaces 53a and 53b directed forward and backward, respectively, and an upper surface 53c connecting the upper edges of the front and rear surfaces 53a and 53b.

Figure 4:
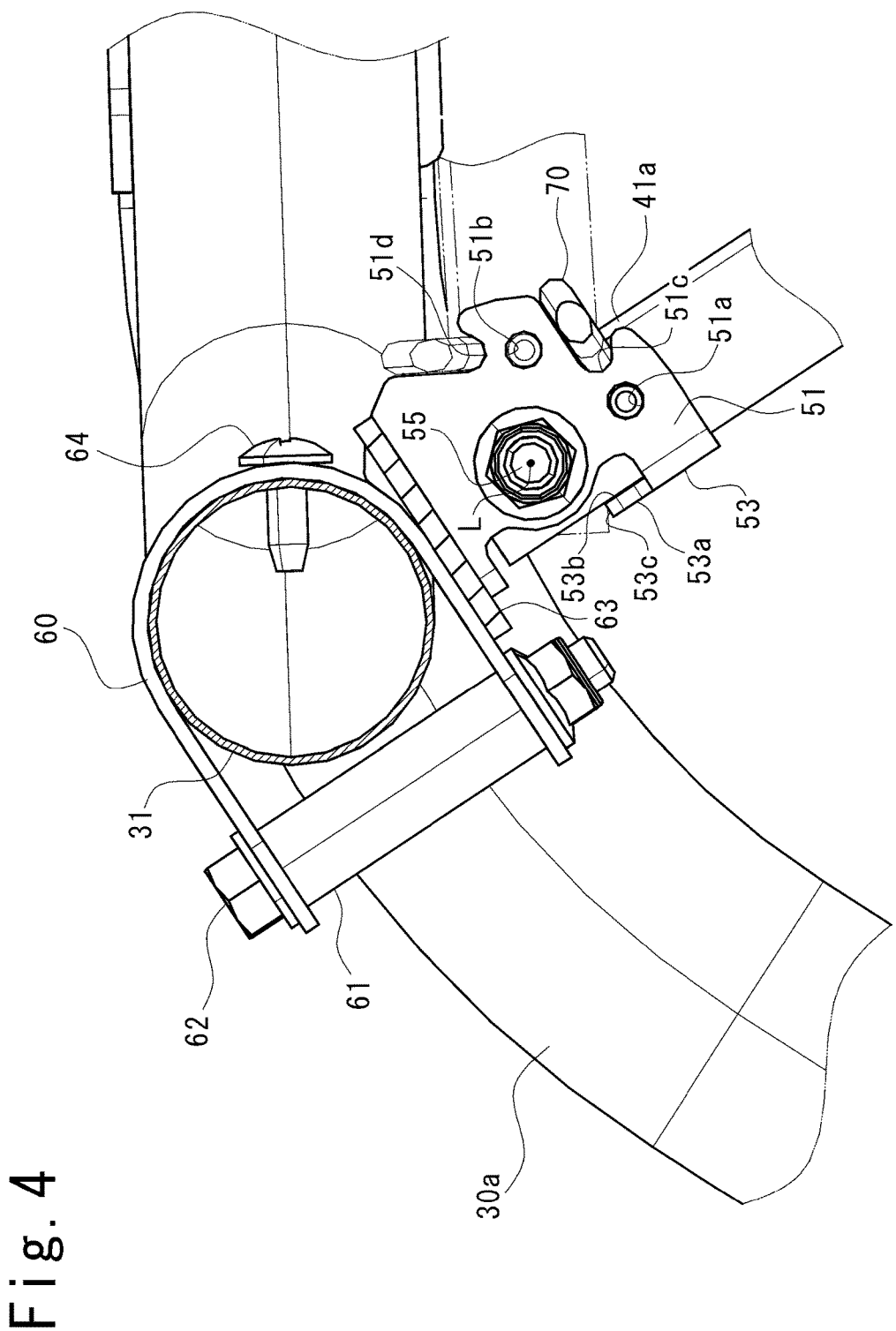
FIG. 4 is a sectional view taken along line IV-IV indicated in FIG. 2.

FIG. 4 is a sectional view taken along line IV-IV indicated in FIG. 2, depicting by solid lines the state where the holding portion 40 is located at the usable position and depicting by chain lines the state where the holding portion 40 is located at the withdrawing position. As depicted in FIG. 4, the holding portion 40 is turned about the center axis L to be located at the usable position when the proximal end 41a is in contact with the rear surface 53b of the connecting portion 53, and to be located at the withdrawing position when the proximal end 41a is in contact with the upper surface 53c of the connecting portion 53.

In other words, the rear surface 53b prevents the holding portion 40 from turning (downward) to be closer to the front seat 7 beyond the usable position. The upper surface 53c prevents the holding portion 40 from turning (upward) to be distant from the front seat 7 beyond the withdrawing position. The rear surface 53b serves as the first stopper according to the present invention whereas the upper surface 53c serves as the second stopper according to the present invention.

The left support portion 50L is exemplified in the above description. The right support portion 50R is configured similarly, although not described in detail. The proximal end of the fourth linear portion 44 is turnably supported by the right support portion 50R and is located and fixed at the usable position and the withdrawing position.

The proximal portion 60 has a section in a U shape. The proximal portion 60 is fixed to the first cross member 31 in such a manner that an inner surface of the U-shaped section sandwiches the outer periphery of the first cross member 31, and ends of the U-shaped section are fastened by a fastening member 62 with a color 61 being interposed, at two transverse positions. The proximal portion 60 is provided, on the side same as the front-seat central grip 35, with a positioning bracket 63.

As depicted in FIG. 3, the positioning bracket 63 is attached by welding or the like to the lower end of the proximal portion 60, and is provided, at the distal end, with a branched portion 63a that is branched into two portions and substantially surrounds the outer periphery of the front-seat central grip 35. The branched portion 63a surrounding the outer periphery of the front-seat central grip 35 allows the proximal portion 60 to be located in the axially turning direction and the transverse direction and be easily assembled to the first cross member 31.

As depicted in FIG. 4, when a fastening member 64 is fastened from the outer peripheral surface of the positioned proximal portion 60 to the first cross member 31, the proximal portion 60 can be fixed at a predetermined position on the first cross member 31. More specifically, the proximal portion 60 is located at the predetermined position on the first cross member 31 by the positioning bracket 63 and the fastening member 64, and is detachably fixed to the first cross member 31 by the fastening member 62 with the color 61 being interposed, at the two transverse positions.

Figure 5:
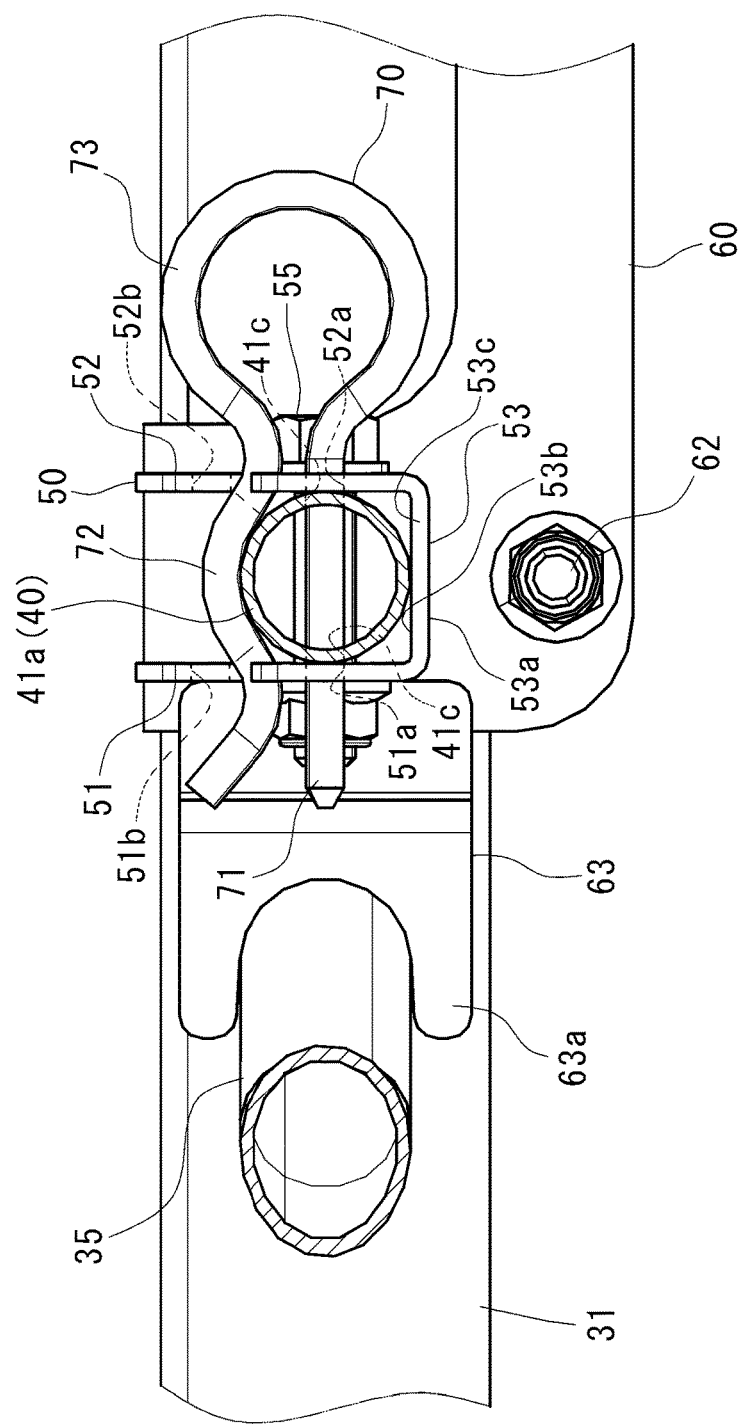
FIG. 5 is a sectional view taken along line V-V indicated in FIG. 2.

FIG. 5 is a sectional view taken along line V-V indicated in FIG. 2, of the first linear portion 41 of the holding portion 40 viewed in a direction perpendicular to the axis, depicting the state where the holding portion 40 is located at the usable position. As depicted in FIG. 5, the positioning pin 70 has a pin portion 71 configured to position the holding portion 40 in the turning direction, a locked portion 72 where the positioning pin 70 is locked to the holding portion 40 and the support portion 50, and a handle 73 used for attaching and detaching the positioning pin 70.

The pin portion 71 penetrates the first positioning holes 51a and 52a (or the second positioning holes 51b and 52b) in the left and right opposed portions 51 and 52 and the turn hole 41b in the holding portion 40. The pin portion 71 has a chamfered distal end 71a so as to improve insertion of the pin portion 71.

The locked portion 72 has an arc portion 72a substantially surrounding a half outer periphery of the proximal end 41a of the holding portion 40, and is engaged with the outer periphery of the proximal end 41a of the holding portion 40 in the state where the pin portion 71 is inserted to the holding portion 40 and the support portion 50. The locked portion 72 is further locked to the first cutouts 51c and 52c (or the second cutouts 51d and 52d) of the left and right opposed portions 51 and 52 in the state where the positioning pin 70 is assembled to the support portion 50.

The handle 73 has a substantially annular shape so as to be held by a finger tip catching the handle. The positioning pin 70 can be thus easily attached to and detached from the holding portion 40 and the support portion 50.

The additional grip 39 will be described in terms of its operation.

The additional grip 39 is located at the withdrawing position when a crew gets into the riding space S. The additional grip 39 in this state will not inhibit the crew from getting into the riding space S, and will not block the view of the crew on board. A crew in an average body size holds the front-seat central grip 35 or the front-seat right grip 36 to support his/her body.

For small crew, the additional grip 39 is moved from the withdrawing position to the usable position. In this case, the positioning pin 70 is initially detached from the holding portion 40 and the support portion 50 and the holding portion 40 is turned to the usable position. The proximal end 41a of the holding portion 40 is turned downward until coming into contact with the rear surface 53b of the connecting portion 53 to move the holding portion 40 to the usable position. In this state, the pin portion 71 of the positioning pin 70 is inserted to the first positioning hole 51a, the through hole 41c, and the first positioning hole 52a to locate the holding portion 40 at the usable position.

The locked portion 72 of the positioning pin 70 is engaged with the outer periphery of the proximal end 41a as well as is engaged with the first cutouts 51c and 52c of the support portion 50 to prevent detachment of the positioning pin 70 from the holding portion 40 and the support portion 50.

The additional grip 39 located at the usable position is set such that the projection amount H3 to the riding space S is longer than the projection amount H1 of the front-seat central grip equipped as standard. Even a small crew, who has difficulty in holding the front-seat central grip in a naturally seated posture, can easily hold the additional grip 39 in a naturally seated posture without raising his/her back from the seat back 7a.

The positioning pin 70 can ideally resist against to force which causes the holding portion 40 to turn by a load applied by a crew. Particularly the holding portion 40 located at the usable position extends backward and downward and is thus likely to receive force of turning downward. In addition to the pin portion 71 of the positioning pin 70, the rear surface 53b of the connecting portion 53 of the support portion 50 serves as a stopper against this force and more ideally resists the same.

In order to turn the holding portion 40 from the usable position to the withdrawing position, the positioning pin 70 is detached from the holding portion 40 and the support portion 50 and the holding portion 40 is turned to the withdrawing position. The proximal end 41a of the holding portion 40 is turned upward until coming into contact with the upper surface 53c of the connecting portion 53 to move the holding portion 40 to the withdrawing position. In this state, the pin portion 71 of the positioning pin 70 is inserted to the second positioning hole 51b, the through hole 41c, and the second positioning hole 52b to locate the holding portion 40 at the withdrawing position.

The positioning pin 70 and the upper surface 53c of the support portion 50 ideally resist turn of the holding portion 40 located at the withdrawing position as well as at the usable position.

The grip mounting structure for the utility vehicle thus configured can achieve the following effects.

(1) The projection amount H3 of the additional grip 39 to the riding space S is larger than the projection amount H1 of the front-seat central grip 35. Even a small crew can hold the additional grip 39 in a naturally seated posture. Furthermore, the additional grip 39 can be mounted selectively for such a small crew. This configuration prevents the additional grip 39 from being equipped uselessly for a crew who does not need the additional grip 39, and can thus suppress increase in cost for the utility vehicle.

(2) The additional grip 39 is movable between the usable position and the withdrawing position. The additional grip 39 not in use is moved to the withdrawing position so as not to inhibit a crew from getting into and out of the riding space S as well as from holding the front-seat central grip 35.

(3) The configuration is simply provided with the positioning pin 70, the through hole 41c provided in the holding portion 40, and the first positioning holes 51a and 52a (or the second positioning holes 51b and 52b) provided in the support portion 50 so as to easily locate and fix the holding portion 40 at the usable position and the withdrawing position.

(4) The positioning pin 70 can be attached to and detached from the holding portion 40 and the support portion 50 manually without any tool. The holding portion 40 can be thus easily turned to the usable position or the withdrawing position.

(5) The holding portion 40 is brought into contact with the rear surface 53b of the support portion 50 so as to easily cause the through hole 41c in the holding portion 40 to align with the center axes of the first positioning holes 51a and 52a in the support portion 50. This configuration can improve workability of inserting the positioning pin 70 for the holding portion 40 located at the usable position. Furthermore, the rear surface 53b of the support portion 50 as well as the positioning pin 70 can ideally resist a load for turning the holding portion 40 beyond the usable position.

(6) The holding portion 40 is brought into contact with the upper surface 53c of the support portion 50 so as to easily cause the through hole 41c in the holding portion 40 to align with the center axes of the second positioning holes 51b and 52b in the support portion 50. This configuration can improve workability of inserting the positioning pin 70 for the holding portion 40 located at the withdrawing position. Furthermore, the upper surface 53c of the support portion 50 as well as the positioning pin 70 can ideally resist a load for turning the holding portion 40 beyond the withdrawing position.

(7) The additional grip 39 is easily fixed at the predetermined position on the first cross member 31 by fastening the proximal portion 60 to the outer periphery of the first cross member 31 using the fastening member 64. Furthermore, the branched portion 63a of the positioning bracket 63 surrounding the outer periphery of the front-seat central grip 35 allows the proximal portion 60 to be located in the axially turning direction and the transverse direction and be easily assembled to the first cross member 31.

(8) The third linear portion 43 of the holding portion 40 located at the usable position is bent from the right end of the second linear portion 42 and extends upward. The third linear portion 43 prevents a hand of a crew holding the second linear portion 42 from further sliding toward the distal end, and thus prevents the hand of the crew holding the second linear portion 42 from releasing the holding portion 40.

Figure 6:
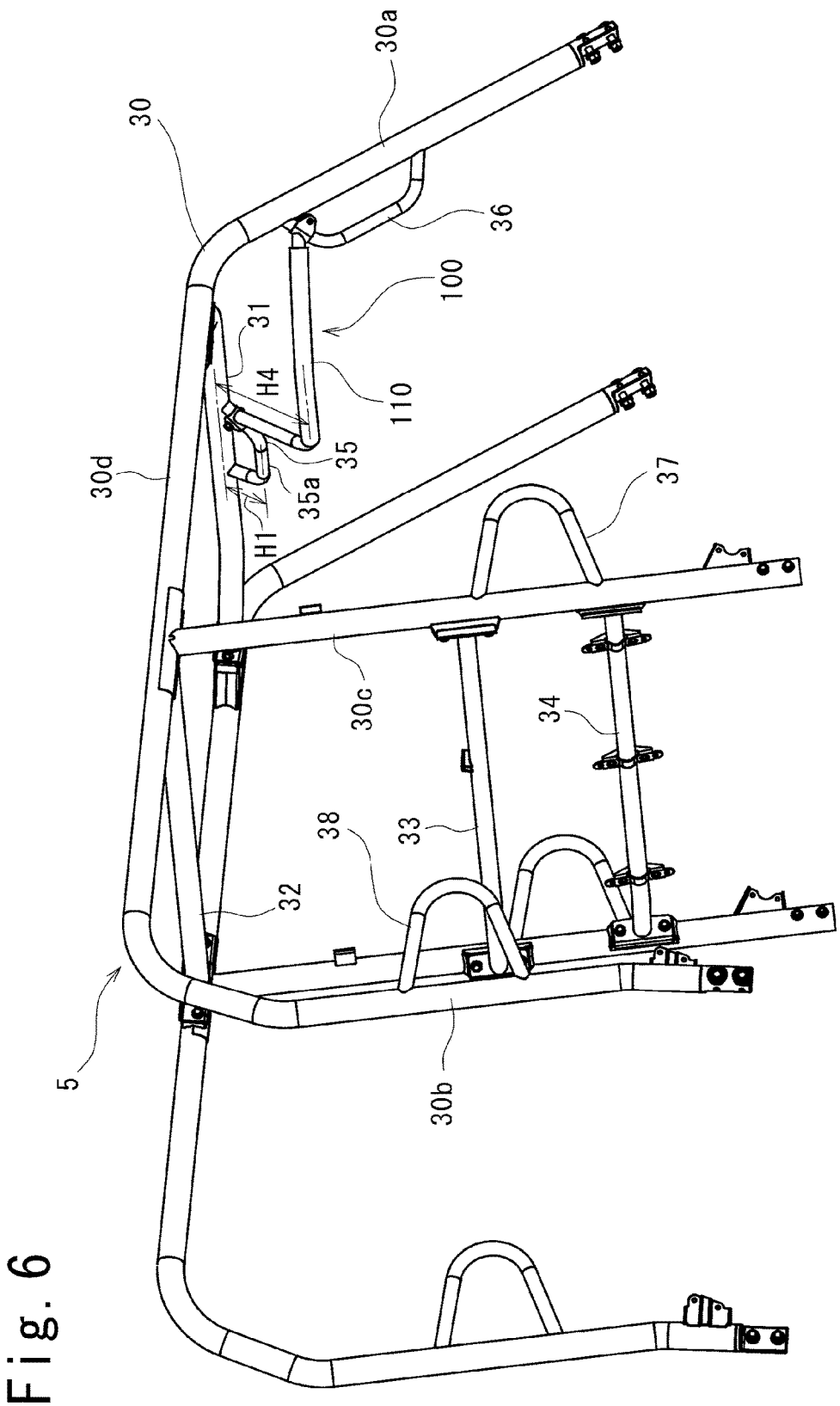
FIG. 6 is a perspective view of a R.O.P.S. in a grip mounting structure according to a modification example.

The above embodiment exemplifies the case where the first cross member 31 is equipped with the additional grip 39. As depicted in FIG. 6, an additional grip 100 according to a modification example can be provided, in place of the additional grip 39, from the front-seat central grip 35 to the front-seat right grip 36. Also in this case, a projection amount H4 from the center axis of the first cross member 31 is set to be substantially twice the projection amount H1 of the front-seat central grip 35.

The additional grip 100 has a first end detachably joined by a clamp to the front-seat central grip 35 and a second end detachably joined by a clamp to the front-seat right grip 36. A small crew can thus hold the additional grip 100 in a naturally seated posture, whereas the additional grip 100 is detached so as not to inhibit a crew in an average body size from getting into and out of the riding space S and block the view thereof.

The additional grip 100 is covered with an elastic body 110 at least on the portion held by a crew. The elastic body 110 can be entirely or partially provided on the portion to be held. The elastic body 110 is deformed in accordance with gripping force of the crew and the size of a hand of the crew, so as to offer comfortable hold and prevent slip of the hand holding the additional grip 100. This configuration can improve holdability and further improve body support. The elastic body 110 can be made of rubber, sponge, resin, or the like.

Figure 7:
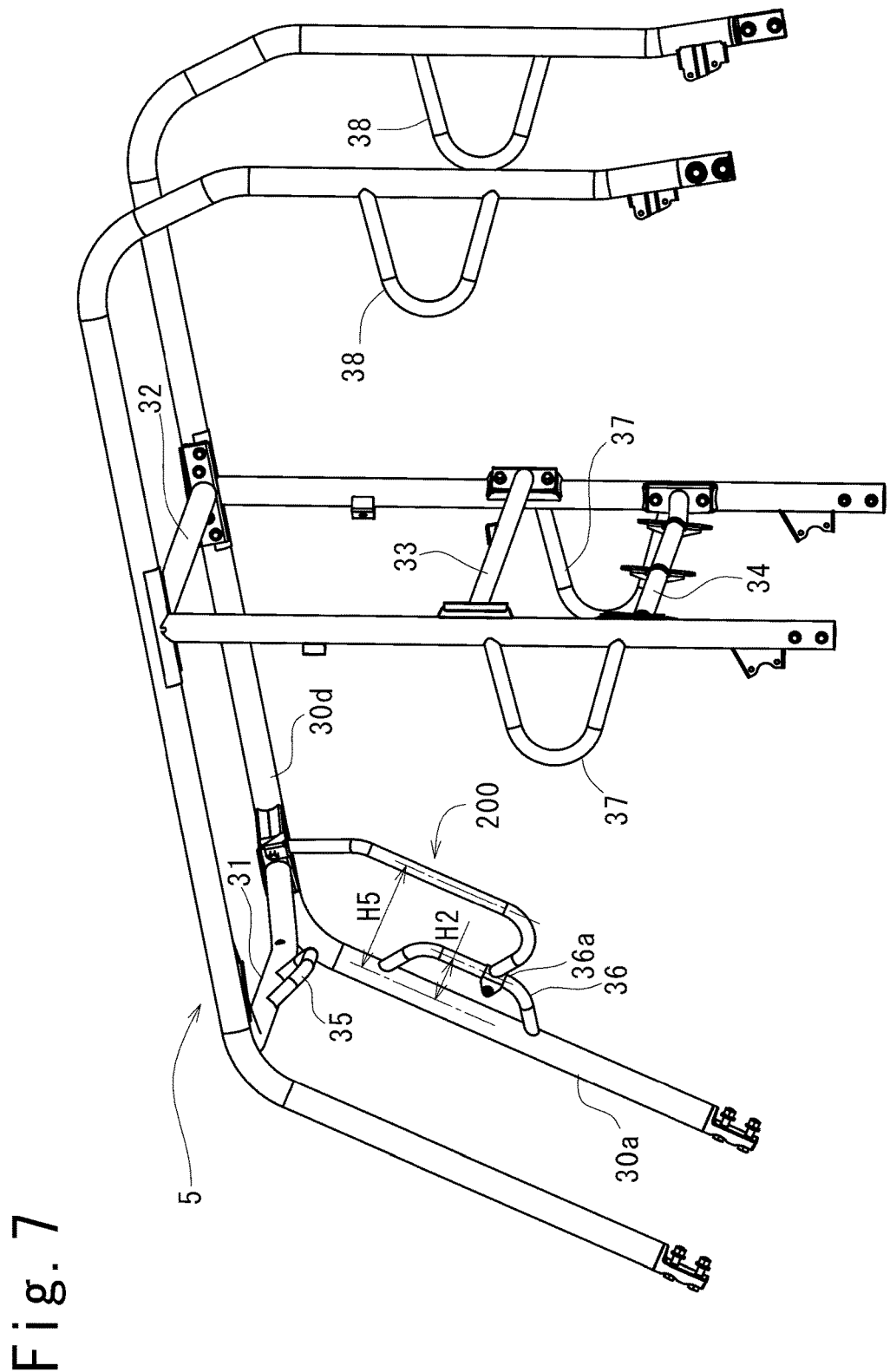
FIG. 7 is a perspective view of a R.O.P.S. in a grip mounting structure according to another modification example.

As depicted in FIG. 7, in place of the additional grip 39, an additional grip 200 according to still another modification example can be provided from the front-seat right grip 36 to the R.O.P.S. 5. The additional grip 200 has a first end detachably joined by a clamp to the front-seat right grip 36 and a second end jointly fastened and fixed to an attachment portion of the first cross member 31 to the right side unit 30. A small crew particularly seated in the right seating area 7R in the front seat 7 (see FIG. 1) can thus hold the additional grip 200 in a natural posture.

The above embodiment describes the additional grip 39 for a crew seated on the front seat 7. The present invention is not limited to this case but an additional grip can be provided for a crew seated on the rear seat 8. Such an additional grip can be detachably mounted to the second cross member 32, the third cross member 33, the fourth cross member 34, the mid pillar portion 30c of the side unit 30, or the like such that the holding portion is located closer to a crew, or can be provided so as to be movable between the usable position and the withdrawing position.

The above embodiment exemplifies the case where the additional grip is turnable between the usable position and the withdrawing position. The present invention is not limited to this case. As described with reference to FIGS. 6 and 7, the additional grip has only to be movable between the usable position and the withdrawing position. For example, the additional grip can be slidable between the usable position and the withdrawing position.

The present invention can be modified or changed in various manners without departing from the spirit and scope of the present invention recited in the following claims.

What is claimed is:

1. A grip mounting structure for a utility vehicle, the structure comprising:
   a R.O.P.S. surrounding a riding space provided with a seat;

a first grip provided to the R.O.P.S. and having a first holding portion configured to be held by a crew member sitting on the seat; and a second grip detachably mounted on at least one of the R.O.P.S. and the first grip, the second grip having a second holding portion configured to be held by the crew member; wherein the second holding portion has a projection amount to the riding space larger than a projection amount of the first holding portion to the riding space.

2. The grip mounting structure for a utility vehicle according to claim 1, wherein
the second holding portion is movable between a usable position where the second holding portion is held by the crew member and a withdrawn position where the second holding portion is withdrawn so as to be distant from the seat and not held by the crew member.

3. The grip mounting structure for a utility vehicle according to claim 2, wherein
the second grip further includes a proximal portion mounted to at least one of the R.O.P.S. and the first grip, a support portion fixed to the proximal portion and supporting the second holding portion so as to be movable between the usable position and the withdrawn position, and a positioning pin configured to locate the second holding portion at the usable position or the withdrawn position,
the support portion has a first positioning hole and a second positioning hole,
the second holding portion has a through hole, the through hole has a center axis that aligns with a center axis of the first positioning hole when the second holding portion is located at the usable position and that aligns with a center axis of the second positioning hole when the second holding portion is located at the withdrawn position,
the second holding portion is located at the usable position by the positioning pin that is inserted through the through hole and the first positioning hole, and
the second holding portion is located at the withdrawn position by the positioning pin that is inserted through the through hole and the second positioning hole.

4. The grip mounting structure for a utility vehicle according to claim 3, wherein the positioning pin is manually attached to and detached from the through hole.

5. The grip mounting structure for a utility vehicle according to claim 3, wherein the support portion includes a first stopper configured to prevent the second holding portion located at the usable position from further moving beyond the usable position.

6. The grip mounting structure for a utility vehicle according to claim 3, wherein the support portion includes a second stopper configured to prevent the second holding portion located at the withdrawn position from further moving beyond the withdrawn position.

7. The grip mounting structure for a utility vehicle according to claim 3, wherein the proximal portion is fixed by a fastening member to the R.O.P.S. or the first grip.

8. The grip mounting structure for a utility vehicle according to claim 1, wherein the second holding portion is at least partially covered with an elastic body.

9. The grip mounting structure for a utility vehicle according to claim 3, wherein:
the second holding portion has a proximal end supported by the support portion and a distal end located opposite to the proximal end; and
the distal end is bent upward in the state where the second holding portion is located at the usable position.

10. A utility vehicle comprising:
a R.O.P.S. surrounding a riding space provided with a seat;
a first grip provided to the R.O.P.S. and having a first holding portion configured to be held by a crew member sitting on the seat; and
a second grip detachably mounted on at least one of the R.O.P.S. and the first grip, the second grip having a second holding portion configured to be held by the crew member, wherein
the second holding portion has a projection amount into the riding space that is larger than a projection amount of the first holding portion into the riding space.

11. A grip mounted to a utility vehicle including:
a R.O.P.S. surrounding a riding space provided with a seat, and a first grip provided to the R.O.P.S. and having a first holding portion configured to be held by a crew member sitting on the seat; wherein
the grip is regarded as a second grip, is detachably mounted to at least one of the R.O.P.S. and the first grip, and has a second holding portion configured to be held by the crew member, and
the second holding portion has a projection amount into the riding space that is larger than a projection amount of the first holding portion into the riding space.

* * * * *